United States Patent

Ueda

[11] Patent Number: 5,548,807
[45] Date of Patent: Aug. 20, 1996

[54] MOBILE COMMUNICATION SYSTEM COMPRISING BASE STATIONS EACH HAVING OMNIDIRECTIONAL ANTENNA FOR RECEPTION OF INTERFERENCE WAVE

[75] Inventor: Tetsuro Ueda, Tokyo, Japan

[73] Assignee: NEC Corporation, Tokyo, Japan

[21] Appl. No.: 319,526

[22] Filed: Oct. 7, 1994

[30] Foreign Application Priority Data

Oct. 7, 1993 [JP] Japan .................................. 5-251889

[51] Int. Cl.$^6$ .............................. H04B 7/26; H04Q 7/20
[52] U.S. Cl. ...................... 455/33.1; 455/34.1; 455/56.1; 455/62; 455/67.1
[58] Field of Search ................... 455/33.1–33.4, 455/34.1, 34.2, 56.1, 62, 67.1, 25, 54.1, 54.2

[56] References Cited

U.S. PATENT DOCUMENTS

| 4,128,740 | 12/1978 | Graziano . | |
|---|---|---|---|
| 5,093,924 | 3/1992 | Toshiyuki et al. | 455/62 X |
| 5,093,927 | 3/1992 | Shanley | 455/62 X |
| 5,203,008 | 4/1993 | Yasuda et al. | 455/62 X |
| 5,355,514 | 10/1994 | Borg | 455/56.1 X |

FOREIGN PATENT DOCUMENTS

| 0446363 | 9/1991 | European Pat. Off. . | |
|---|---|---|---|
| 2806178 | 8/1978 | Germany . | |
| 3-131130 | 6/1991 | Japan | 455/34.1 |
| 3167924 | 7/1991 | Japan . | |

OTHER PUBLICATIONS

Patent Abstract of Japan of JP Appl. No. 3-167924(A), vol. 15, No. 408, Oct. 17, 1991, p. 107 E 1123.
Anderson et al., "Adaptive Channel Allocation in a TIA IS-54 System", (1992), pp. 778–781.

Primary Examiner—Chi H. Pham
Attorney, Agent, or Firm—Foley & Lardner

[57] ABSTRACT

A mobile communication system comprises base stations each having sector antennas and an omnidirectional antenna for receiving up-going interference waves on all communication channels previously allocated thereto to detect power levels of those interference waves. The power levels of up-going interference waves on all communication channels are monitored at all times by using the omnidirectional antenna. When a calling signal from a mobile station is received by a certain sector antenna, respective up-going C/I ratios are calculated on the channels not yet used among communication channels previously allocated to that sector. Among channels where the calculated up-going C/I ratios satisfy a predetermined quality reference, a channel to be allocated to the mobile station is determined.

11 Claims, 7 Drawing Sheets

MOBILE COMMUNICATION SYSTEM COMPRISING BASE STATIONS EACH HAVING OMNIDIRECTIONAL ANTENNA FOR RECEPTION OF INTERFERENCE WAVE

BACKGROUND OF THE INVENTION

1. Field of the Invention

The present invention relates to a mobile communication system including a sector cell arrangement, and more particularly to a mobile communication system which allocates communication channels with use of a carrier wave/interference wave power ratio (hereinafter, referred to as a C/I ratio.).

2. Prior Art

Referring to FIG. 1, a sector cell arrangement in a conventional mobile communication system is illustrated in an exemplified manner. Sector antennas provided in base stations 11, 12 form sectors $A_1$, $B_1$, $C_1$ and $A_2$, $B_2$, $C_2$, respectively. A situation will be described wherein a mobile station 14 moving in the sector $C_2$ sends a call to the base station 12 which hereby allocates the same channel as a communication channel allocated by the base station 11 communicating with a mobile station 13 moving in the sector $C_1$ through the allocated channel.

Since the same channel is used, the mobile station 14 receives not only a down-going carrier wave from the base station 12 but also a down-going interference wave 15 from the base station 11, while the base station 12 receives not only an up-going carrier wave from the base station 14 but also an up-going interference wave 16 from the mobile station 13 under communication with the base station 11. It is herein assumed that "up-going" denotes a direction from any mobile station to any base station while "down-going" denotes a direction from any base station to any mobile station.

In mobile communication systems, the following two systems have generally been proposed for allocation of dynamic channels.

In the first system, up-going interference wave power and up-going carrier wave power are measured for each sector channel to calculate an up-going C/I ratio. Further, there is selected an optimum one of channels having the up-going C/I ratios exceeding a predetermined threshold (or a quality reference), taking the channel conditions of surrounding base stations into consideration, and the selected channel is in turn allocated to an originating call.

In the second system, an up-going C/I ratio is similarly estimated and a mobile station is informed of a communication channel where the up-going C/I ratio exceeds a quality reference as a candidate channel. The mobile station measures a down-going interference wave and a down-going carrier wave on the informed candidate channel, and the measured result is sent back to the base station which estimates a down-going C/I ratio and allocates to the originating call a channel where the estimated down-going C/I ratio exceeds a predetermined threshold. In this system, once a C/I ratio of a certain channel in a cell is confirmed to exceed a predetermined quality reference, the quality of that channel is guaranteed to some degree without referring to surrounding base stations, so that there are reduced process procedures and the amount of information transfer for control of channel allocation. Such a system is disclosed in Japanese Patent Laid-Open No. 3-167924.

However, when the sectors formed by the base stations 11 and 12 are directed in the same direction, as illustrated in FIG. 1, the direction of transmission of the interference wave 16 from the mobile station 13 is out of the range of directivity of the sector antenna of the sector $C_2$, so that a received electric field is severely reduced. Contrarily, the down-going interference wave 15 from the base station 11 is received with an omnidirectional antenna of the mobile station 14 because of the mobile station 14 being existent in the range of the directivity of the sector $C_1$. In such a situation, in the dynamic channel allocation method of the first system wherein an optimum channel with the up-going C/I ratio exceeding the quality reference is selected and allocated to an originating call, a communication channel is allocated without taking the down-going C/I ratio into consideration, so that there is a case where any channel not satisfying the down-going quality reference is allocated to result in the loss of the call. More specifically, a receiving electric field level of the up-going interference wave 16 received by a sector antenna having directivity is smaller, so that the up-going C/I ratio is greater than an actual one.

Also in the method of the second system where a channel having both the up-going and down-going C/I ratios satisfying the quality reference is allocated, the up-going C/I ratio becomes a greater value than an actual one, as described above, so that the number of candidate channels not actually satisfying the quality reference is increased. Accordingly, a candidate channel informed from the base station 12 to the mobile station 14 sometimes fails to satisfy the quality reference of the down-going C/I ratio, resulting in an increased number of times of communication between the base station 12 and the mobile station 14. In other words, when the informed candidate channel does not satisfy the quality reference of the down-going C/I ratio, candidate channels are sequentially selected in the order previously determined at all base stations, and communication is repeated until a channel satisfying the quality reference is found.

SUMMARY OF THE INVENTION

To solve the problems with the prior art, it is an object of the present invention to provide a mobile communication system capable of ensuring an accurate C/I ratio for judgement of a channel quality.

Another object of the present invention is to provide a channel allocation method wherein there is no call loss and the number of communication procedures and the amount of communication can be reduced.

In channel allocation in accordance with the present invention, up-going interference wave power on all communication channels in each sector is monitored at all times by using an omnidirectional antenna provided in each base station. When a calling signal from a mobile station is received by a certain sector antenna and a sector receiver, respective up-going C/I ratios are calculated on the channels not yet used among communication channels previously allocated to that sector. Among channels where the calculated up-going C/I ratios satisfy a predetermined quality reference, there is determined a channel to be allocated to the mobile station. Provided there is found any channel where the up-going C/I ratio satisfies a predetermined quality reference, communication may be started using that channel. In this case, the up-going interference wave is received through the omnidirectional antenna, so that there is no attenuation of reception level stemming from the directivity of a sector antenna as in the prior art. Thus, only confirmation of a fact that the up-going C/I ratio satisfies the quality reference ensures the quality of the down-going C/I ratio, and occurrence of any call loss is restricted. A mobile station may be informed of a channel where the up-going C/I ratio satisfies a predetermined quality reference as a candidate channel, and further if the down-going C/I ratio satisfies a predetermined reference, communication may be started using that candidate channel. As described above, the up-going interference wave is received by the omnidirectional antenna, so that there is eliminated the attenuation of a reception level caused by the directivity of the sector antenna as in the prior art. Thus, the number of candidate channels not actually satisfying the quality reference can sharply be reduced, and an allocation channel can be determined rapidly and with the less amount of communication.

The above and other objects, features and advantages of the present invention will become more apparent from the following description when taken in conjunction with the accompanying drawings in which a preferred embodiment of the present invention is shown by way of illustrated example.

DETAILED DESCRIPTION OF THE PREFERRED EMBODIMENTS

Figure 1:
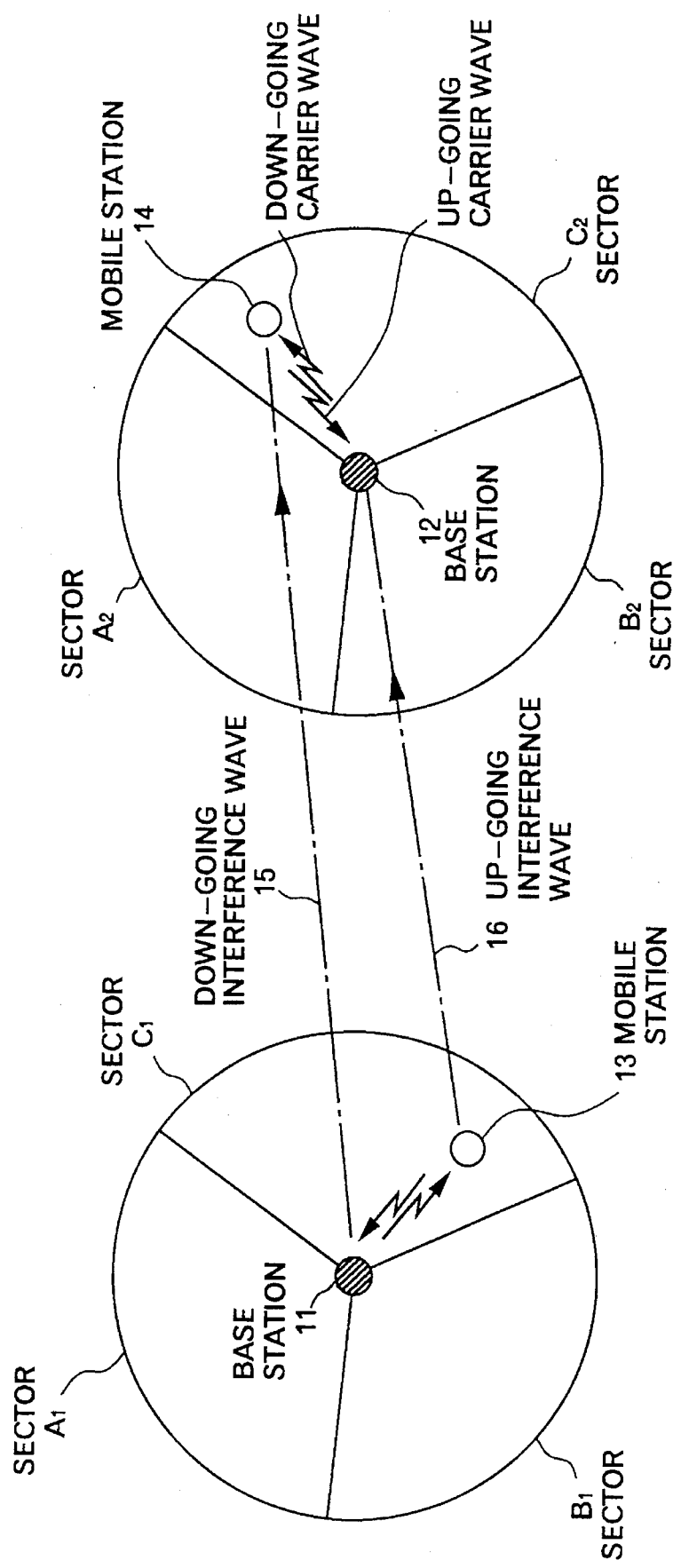
FIG. 1 is a diagrammatic view illustrating a schematic arrangement of sector cells in a conventional mobile communication system.
Figure 2:
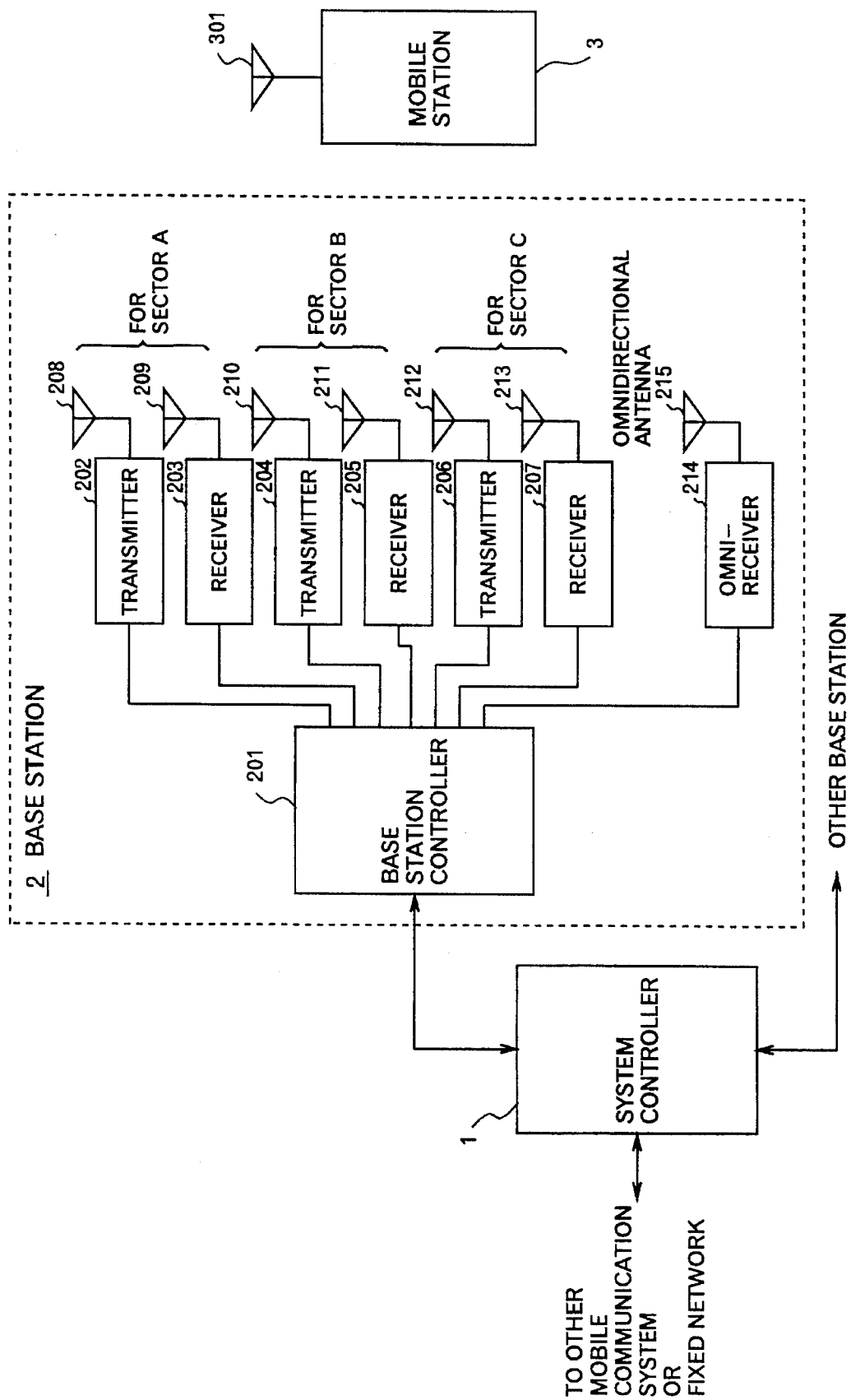
FIG. 2 is a block diagram illustrating a schematic arrangement of a mobile communication system according to an embodiment of the present invention.

Referring to FIG. 2, a mobile communication system according to an embodiment of the present invention is illustrated. The system is comprised of a plurality of base stations 2 connected to a system controller 1 and a plurality of mobile stations 3. A service area of the mobile communication system is divided into a plurality of cells, each cell including three sectors (A, B, and C). The system controller 1 is connected with another mobile communication system or fixed network. The mobile station 3 can move within a service area which is formed by a plurality of base stations 2 for communication through a channel allocated to the neighboring base station 2.

The base station 2 includes a base station controller 201 which is to allocate a plurality of communication channels to the sectors A–C. The base station controller 201 is connected to a transmitter 202 and a receiver 203 for the sector A, a transmitter 204 and a receiver 205 for the sector B, and a transmitter 206 and a receiver 207 for the sector C. The respective sector receivers 203, 205, and 207 are to receive a calling signal sent from the mobile station 3 moving in the corresponding sector, and detect up-going carrier wave power of the received calling signal.

To the respective transmitters and receivers for the sectors, there are connected a transmission antenna 208 and a reception antenna 209 for the sector A, a transmission antenna 210 and a reception antenna 211 for the sector B, and a transmission antenna 212 and a reception antenna 213 for the sector C.

Further, the base station controller 201 is connected to a receiver 214 which is in turn connected to an omnidirectional antenna 215 for monitoring at all times up-going interference wave power on all communication channels previously allocated to the base station 2. The receiver 214 receives the up-going interference wave at all times and updates a measured power of the same.

Figure 3:
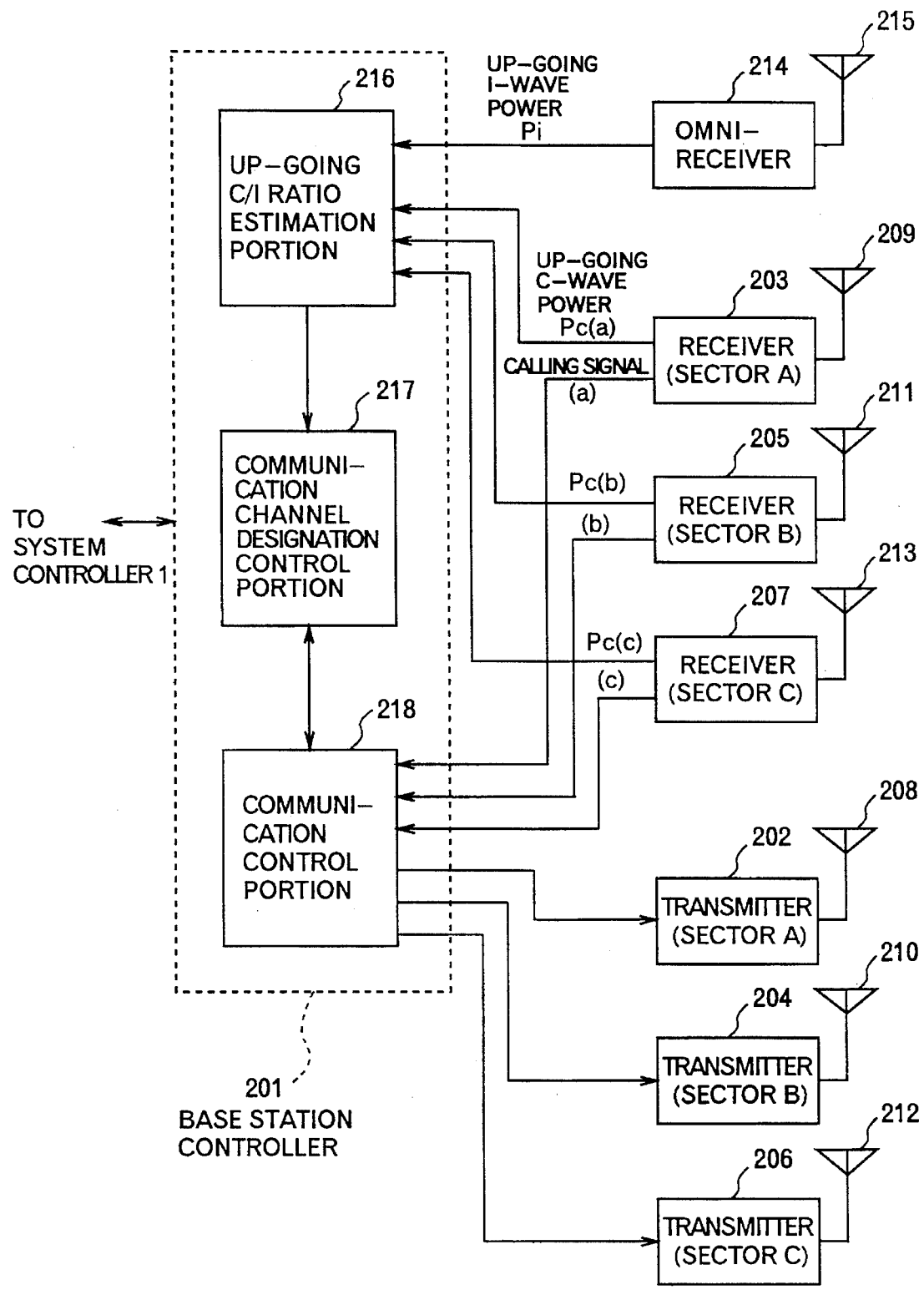
FIG. 3 is a block diagram illustrating a further detailed functional arrangement of a base station in the present embodiment.

As illustrated in FIG. 3, the base station controller 201 is comprised of function blocks of an up-going C/I ratio estimation portion 216, a communication channel designation control portion 217, and a communication control portion 218. The up-going C/I ratio estimation portion 216 receives measured values of up-going interference wave power Pi on all of the channels from the receiver 214 and detected values of up-going carrier wave power Pc from a sector receiver receiving a calling signal from the mobile station 3. For example, when the receiver 203 of the sector A receives a calling signal, the receiver 203 transfers an up-going carrier wave power Pc(a) to the up-going C/I ratio estimation portion 216.

The up-going C/I ratio estimation portion 216 estimates, as described later, an up-going C/I ratio for each unused channel in the sector receiving the calling signal, and transfers a result of the estimation to the communication channel designation control portion 217.

The communication channel designation control portion 217 receives the up-going C/I ratios on the unused channels of the associated sector, and compares them with a predetermined quality reference to allocate a proper communication channel to the calling mobile station 3. Through the allocated channel, the communication control portion 218 executes the control of communication with the mobile station. A channel allocation method includes two systems as in the prior art. (they will be described with reference to FIGS. 5 and 6.)

Figure 4:
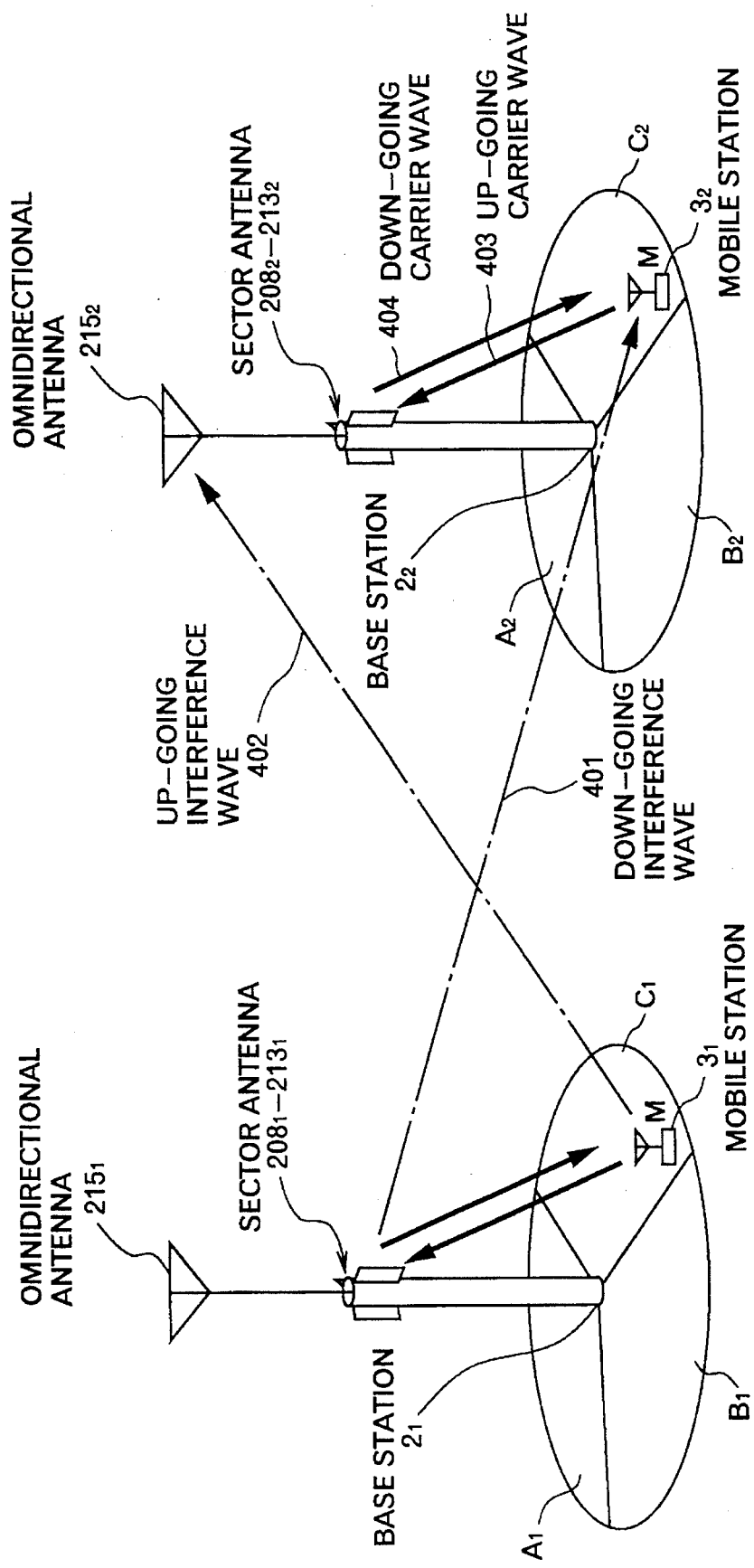
FIG. 4 is a diagrammatic view illustrating a schematic arrangement of sector cells and base stations in the mobile communication system according to the present embodiment.

Referring to FIG. 4, a whole arrangement of a mobile communication system according to the embodiment described above is illustrated. It is noted in the same figure that reference numerals correspond to those illustrated in FIG. 2 and subscripts of the numerals designate distinction among the base stations.

A mobile station $3_1$ moving in a sector $C_1$ of a certain base station $2_1$ is assumed to be under communication through a certain communication channel being allocated by the base station $2_1$. At this time, another base station $2_2$ monitors an up-going interference wave 402 from the mobile station $3_1$ through an omnidirectional antenna $215_2$ at all times. Accordingly, when a certain mobile station $3_2$ moving in a sector $C_2$ sends a call, the base station $2_2$ receives the up-going interference wave 402 from the mobile station $3_1$ and an up-going carrier wave 403 from the mobile station $3_2$, estimates up-going C/I ratios of all unused channels in that sector, and executes channel allocation. Since the up-going interference wave 402 is received by the omnidirectional antenna 215₂, there is no level reduction due to the directivity of a sector antenna as in the prior art, resulting in accurate interference wave measurement.

In a system which checks not only an up-going C/I ratio but also a down-going C/I ratio, the down-going interference wave 401 is received by an omnidirectional antenna of the mobile station 3₂ to measure a power level thereof. If up-going and down-going C/I ratios on a channel informed as a candidate satisfies predetermined references, the base station 2₂ allocates that communication channel to the mobile station 3₂.

In the following, a channel allocation method applicable to the present embodiment will be described in a concrete manner. It is herein assumed that there is a call from the mobile station 3 moving in a sector C for the description hereinafter. The same shall also be applied to other sectors.

Figure 5:
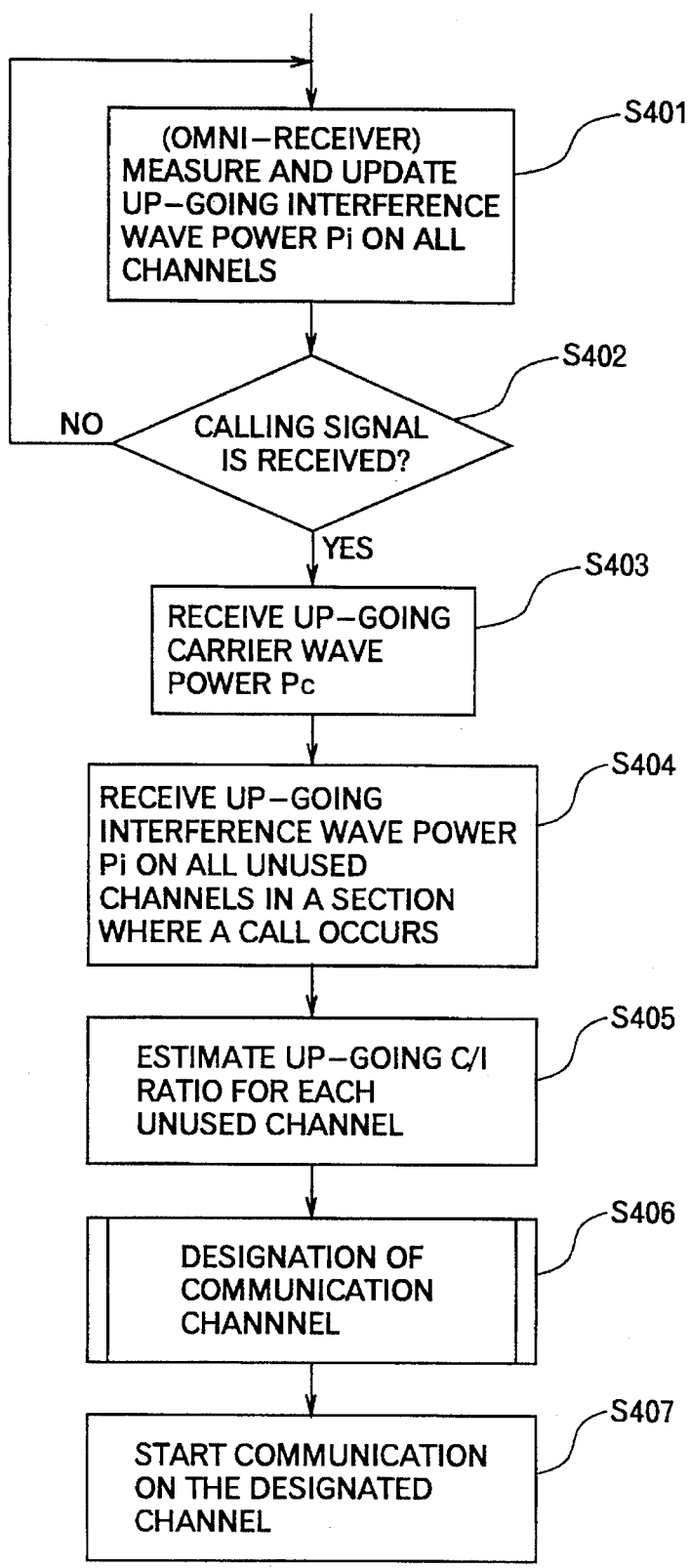
FIG. 5 is a flow chart illustrating a channel allocation procedure of the base station applied to the present embodiment.

FIG. 5 illustrates a first system of the channel allocation method. A receiver 214 of a certain base station 2 monitors at all times up-going interference wave power Pi on all communication channels allocated to the base station 2 in advance and updates at all times the up-going interference wave power Pi until the mobile station 3 sends a call in any sector (S401, No in S402).

When the mobile station 3 sends a call in a certain sector, for example, a sector C (Yes in S402), the calling signal is received by a sector receiver 207 and is transferred to the communication control portion 218 in the base station controller 201. This causes the base station controller 201 to input the up-going carrier wave power Pc(c) from the receiver 207 into the up-going C/I ratio estimation portion 216 (S403).

The base station controller 201 additionally checks channels not yet used in the sector C and reads the updated up-going interference wave power Pi on all unused channels from the receiver 214 and transfers them to the up-going C/I ratio estimation portion 216 (S404). The up-going ratio estimation portion 216 estimates the respective up-going C/I ratios with respect to all unused channels of the sector C, and transmits them to the communication channel designation control portion 217 (S405).

Subsequently, the communication channel designation control portion 217 designates a communication channel using the estimated up-going C/I ratios (S406), and the communication control portion 218 starts communication through the designated channel ($407).

Figure 6:
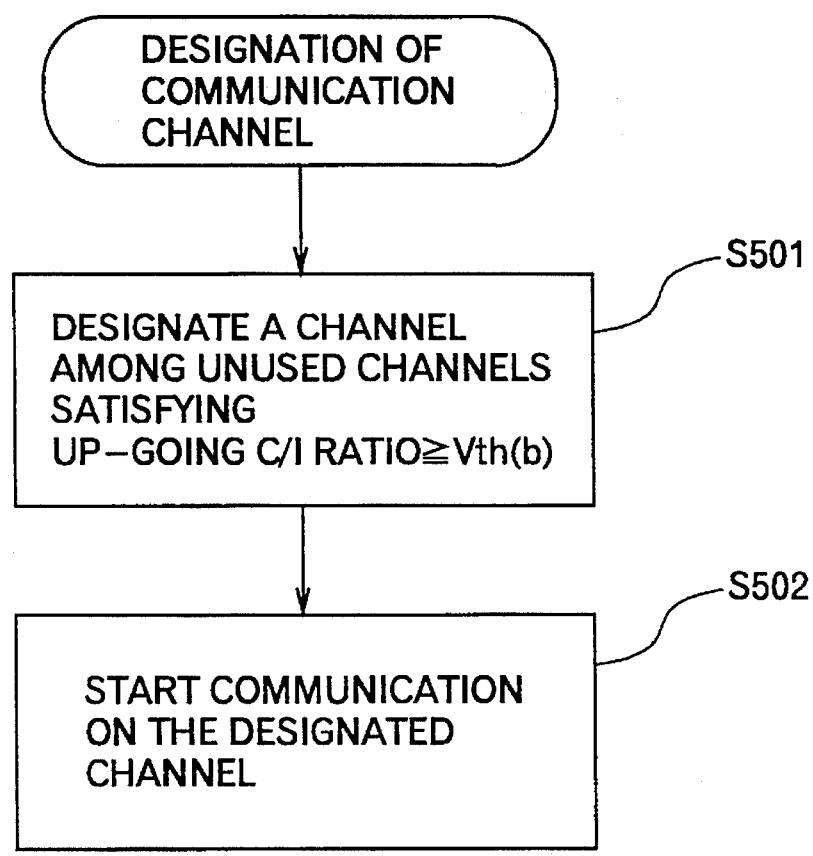
FIG. 6 is a flow chart illustrating an example of communication channel designation in the channel allocation procedure.

FIG. 6 illustrates an example of the communication channel designation. The communication channel designation control portion 217 checks if the respective up-going C/I ratios on the unused channels satisfy a threshold Vth(b) representative of a predetermined quality reference in a base station, and designates a channel among the unused channels satisfying the predetermined quality reference according to a predetermined order (S501). The communication control portion 218 is informed of the designated channel through which communication is started by the transmitter 206 and the receiver 207 in the sector C (S502).

Figure 7:
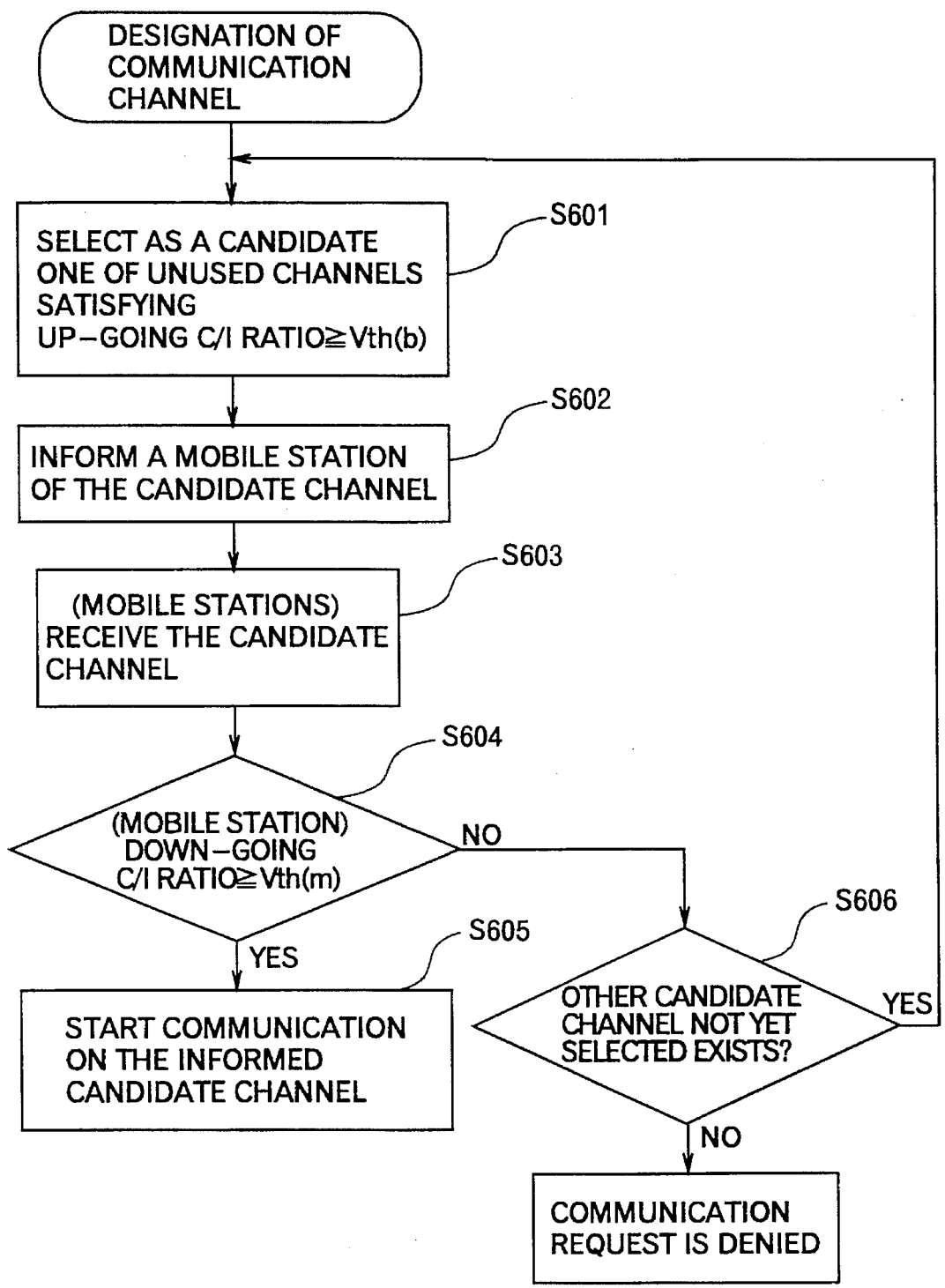
FIG. 7 is a flow chart illustrating another example of the communication channel designation in the channel allocation procedure.

FIG. 7 illustrates another example of the communication channel designation. The communication channel designation control portion 217 checks if the respective up-going C/I ratios on the unused channels satisfy the threshold Vth(b) representative of a predetermined quality reference, and selects as a candidate channel one among the unused channels satisfying the quality reference excepting those selected previously (S601). The mobile station 3 is informed of the selected channel candidate by the communication control portion (S602).

The mobile station 3, once receiving the channel candidate (S603), estimates a down-going C/I ratio on that channel and determines whether it is not smaller than a predetermined quality reference, i.e., a threshold Vth(m) in a mobile station (S604). If the predetermined quality reference is satisfied (Yes in S604), communication is started through that channel (S605). Unless the predetermined quality reference is satisfied (No in S604), it is checked that there is any channel candidate not yet selected (S606). If such a channel candidate is existent (Yes in S606), it is selected as a next channel candidate (S601). If there is no channel candidate, a communication request is denied.

It should be noted that the present invention is not limited to only dynamic channel allocation but may be applicable to any mobile communication system which is of one sharing a frequency, for example to any channel arrangement with use of a time slot of the same frequency.

What is claimed is:

1. A mobile communication system comprising:

a plurality of base stations each having a plurality of sectors, each sector having an antenna and a plurality of communication channels previously allocated thereto; and a plurality of mobile stations each communicating with a neighboring base station through one of said communication channels;

each base station further including, an omnidirectional receiving antenna other than said sector antennas, said omnidirectional receiving antenna configured to receive interference waves;

a receiver coupled to said omnidirectional receiving antenna and configured to receive said interference waves through said omnidirectional receiving antenna on all communication channels previously allocated to said each base station in all directions to detect interference wave levels;

sector receiving means for receiving a calling signal from one of said mobile stations through an antenna of one of said sectors to detect a carrier wave level for communication with said one of said mobile stations;

estimating means for estimating a channel quality of each of unused communication channels of said communication channels previously allocated to said one of said sectors, based upon said detected interference wave levels and said detected carrier wave level; and channel designating means for designating one of said unused communication channels having an estimated channel quality satisfying a predetermined reference quality.

2. The mobile communication system as set forth in claim 1, wherein said receiver updates said interference wave levels at all times.

3. The mobile communication system as set forth in claim 1, wherein the omnidirectional antenna is provided at a top area of each of said base stations and said sector antennas are respectively provided at predetermined positions below said omnidirectional antenna.

4. The mobile communication system as set forth in claim 1, wherein more than one of said plurality of communication channels is allocated to a predetermined frequency in a time division multiplexed manner.

5. In a mobile communication system which includes a plurality of base stations each having a plurality of sectors, each sector having an antenna and a plurality of communication channels previously allocated thereto; and a plurality of mobile stations each communicating with a neighboring base station through one of said communication channels; a channel allocation method comprising the steps of:

receiving interference waves through an omnidirectional antenna other than said sector antennas of each base station on all communication channels previously allocated to said each base station to detect interference wave levels in all directions;

receiving a calling signal from one of said mobile stations through an antenna of one of said sectors to detect a carrier wave level for communication with said one of said mobile stations;

estimating a channel quality of each of unused communication channels of the communication channels previously allocated to said one of said sectors receiving said calling signal, based upon said detected interference wave levels and said detected carrier wave level; and designating one of said unused communication channels having an estimated channel quality satisfying a predetermined reference quality.

6. The channel allocation method as set forth in claim 5, wherein said step of designating a communication channel comprises the step of designating one channel in conformity with a predetermined selection order among said unused communication channels, each having an estimated channel quality satisfying said predetermined reference quality.

7. The channel allocation method as set forth in claim 5, wherein said step of designating a communication channel comprises the steps of:

informing said one of said mobile stations of a candidate channel selected from said unused communication channels each having an estimated channel quality satisfying said predetermined reference quality; and designating said candidate channel as a channel for communication when a channel quality of said candidate channel detected by said one of said mobile stations satisfies a second predetermined reference quality.

8. The channel allocation method as set forth in claim 5, wherein more than one of said plurality of communication channels is allocated to a predetermined frequency in a time division multiplexed manner.

9. A mobile communication system comprising:

a plurality of base stations each having a plurality of sector antennas for respectively providing coverage to a plurality of sectors, and a plurality of communication channels previously allocated to each of said sectors; and a plurality of mobile stations each communicating with a neighboring base station through one of said communication channels, each of said base stations further including, an omnidirectional antenna other than said sector antennas, for receiving interference waves in all directions;

a receiver for receiving said interference waves through said omnidirectional antenna on all communication channels previously allocated to said each of said base stations to detect interference wave levels;

sector communication means for communicating with one of said mobile stations, having a pair of a sector transmitter and a sector receiver for each of said sectors, said sector receiver configured to receive a calling signal from said one of said mobile stations and said sector transmitter configured to transmit a response to said calling signal, wherein said sector communication means detects a carrier wave level for communication with said one of said mobile stations;

estimating means for estimating a channel quality of an unused communication channel of said communication channels previously allocated to one of said sectors from which said calling signal was sent from, based upon said interference wave levels and said carrier wave level; and channel designating means for designating an unused communication channel having said channel quality satisfying a predetermined reference quality.

10. The mobile communication system as set forth in claim 9, wherein the omnidirectional antenna is provided at a top area of each of said base stations and said sector antennas are respectively provided at predetermined positions below said omnidirectional antenna.

11. The mobile communication system as set forth in claim 9, wherein more than one of said plurality of communication channels is allocated to a predetermined frequency in a time division multiplexed manner.

* * * * *